US012632362B2

(12) United States Patent
Chen et al.

(10) Patent No.: US 12,632,362 B2
(45) Date of Patent: May 19, 2026

(54) METHOD TO DETECTING INFINITE LOOPS IN REAL-TIME LOGS FROM A CONTINUOUS INTEGRATION ENVIRONMENT

(71) Applicant: Dell Products L.P., Round Rock, TX (US)

(72) Inventors: Bailu Chen, Chengdu (CN); Alex Linhao Zhou, Chengdu (CN); Longhuan Ye, Chengdu (CN); Susan Sun, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 29 days.

(21) Appl. No.: 18/740,656

(22) Filed: Jun. 12, 2024

(65) Prior Publication Data

US 2025/0013553 A1      Jan. 9, 2025

(30) Foreign Application Priority Data

Jul. 7, 2023    (CN) .......................... 202310838745.4

(51) Int. Cl.
*G06F 11/00*          (2006.01)
*G06F 11/34*          (2006.01)
(52) U.S. Cl.
CPC ................................ *G06F 11/3476* (2013.01)

(58) Field of Classification Search
None
See application file for complete search history.

(56) References Cited

U.S. PATENT DOCUMENTS

| | | | | |
|---|---|---|---|---|
| 2010/0251241 | A1* | 9/2010 | Cardelli | ................ G06F 9/5038 |
| | | | | 718/100 |
| 2020/0026562 | A1* | 1/2020 | Bahramshahry | .... H04L 41/5009 |
| 2021/0144164 | A1* | 5/2021 | Mathur | ............... H04L 63/1425 |
| 2021/0326197 | A1* | 10/2021 | Honnappa | .............. G06N 5/022 |
| 2024/0320041 | A1* | 9/2024 | Halageri | ............... G06F 9/4887 |

OTHER PUBLICATIONS

Google Scholar/Patents search—text refined (Year: 2025).*
Google Scholar/Patents search—text refined (Year: 2026).*

* cited by examiner

*Primary Examiner* — Christopher S McCarthy
(74) *Attorney, Agent, or Firm* — Krishnendu Gupta; Lesley Leonessa

(57)          ABSTRACT
Methods, system, and non-transitory processor-readable storage medium for a log analysis system are provided herein. An example method includes monitoring, by a log analysis system, execution of a continuous integration system on an information system. The log analysis system analyzes an output log of the continuous integration system to determine a trend associated with the execution of the continuous integration system, and identifies a job executing within the continuous integration system, that is executing in an infinite loop, based on the determined trend.

19 Claims, 7 Drawing Sheets

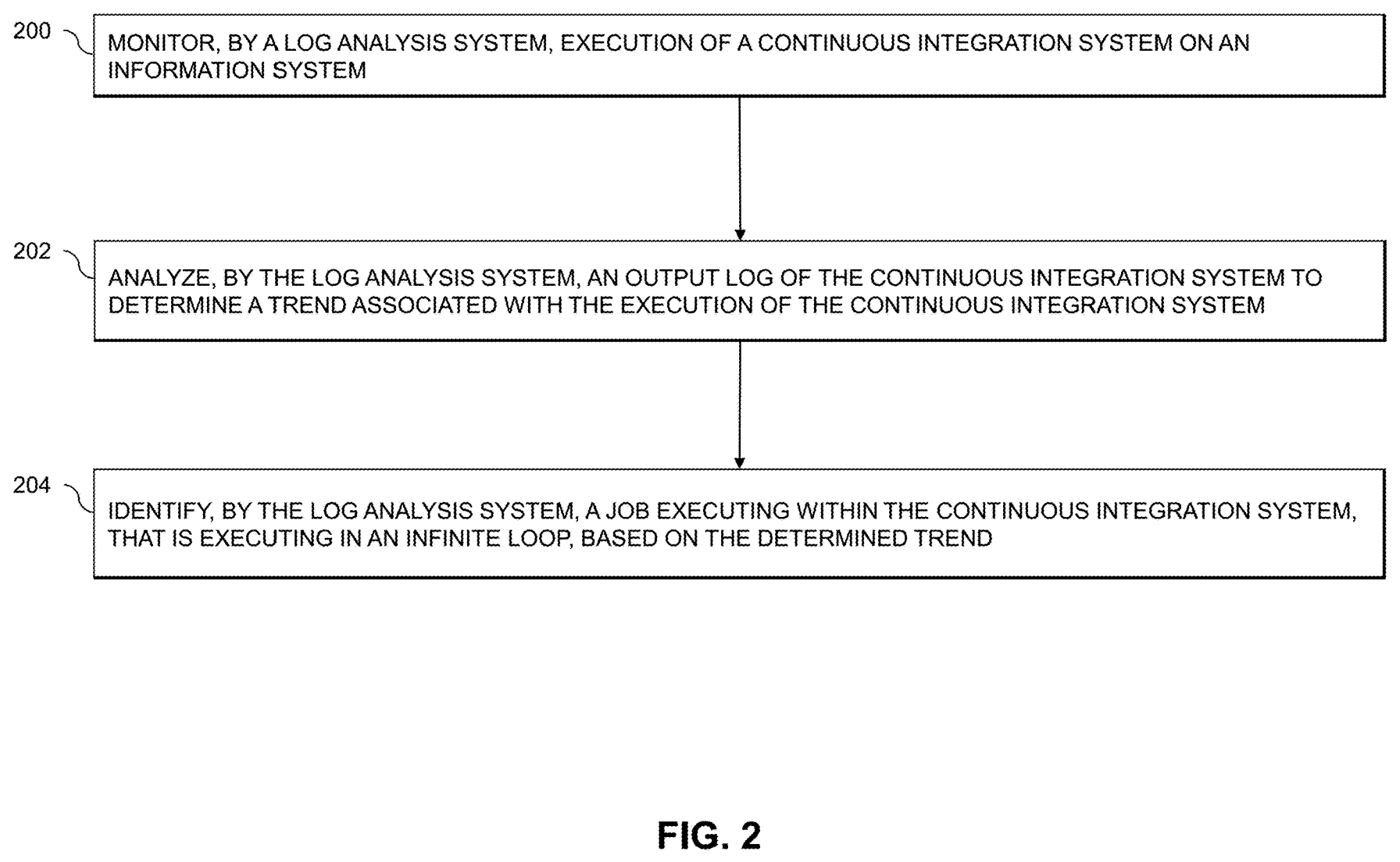

200 MONITOR, BY A LOG ANALYSIS SYSTEM, EXECUTION OF A CONTINUOUS INTEGRATION SYSTEM ON AN INFORMATION SYSTEM

202 ANALYZE, BY THE LOG ANALYSIS SYSTEM, AN OUTPUT LOG OF THE CONTINUOUS INTEGRATION SYSTEM TO DETERMINE A TREND ASSOCIATED WITH THE EXECUTION OF THE CONTINUOUS INTEGRATION SYSTEM

204 IDENTIFY, BY THE LOG ANALYSIS SYSTEM, A JOB EXECUTING WITHIN THE CONTINUOUS INTEGRATION SYSTEM, THAT IS EXECUTING IN AN INFINITE LOOP, BASED ON THE DETERMINED TREND

FIG. 2

WINDOW 1 [EXTRACTED TEXT FEATURES]
LABEL = 6

WINDOW 2 [EXTRACTED TEXT FEATURES]
LABEL = 6

WINDOW 3 [EXTRACTED TEXT FEATURES]
LABEL = 6

WINDOW 4 [EXTRACTED TEXT FEATURES]
LABEL = 6

WINDOW 5 [EXTRACTED TEXT FEATURES]
LABEL = 6

WINDOW 6 [EXTRACTED TEXT FEATURES]
LABEL = 6

NEXT WINDOW LABEL PREDICTED = 6
RESULT: JOB IS EXECUTING IN AN INFINITE LOOP

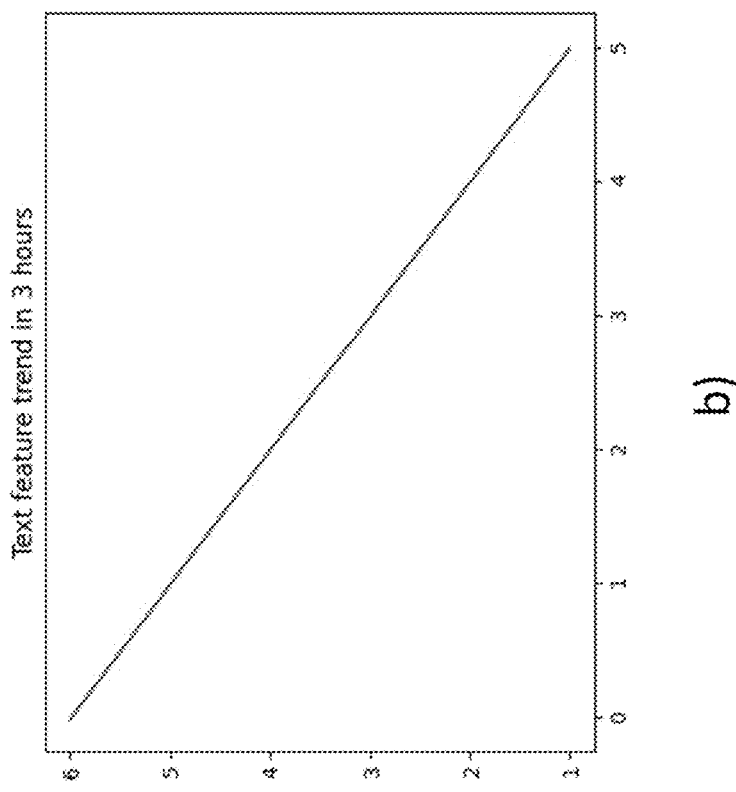
b)
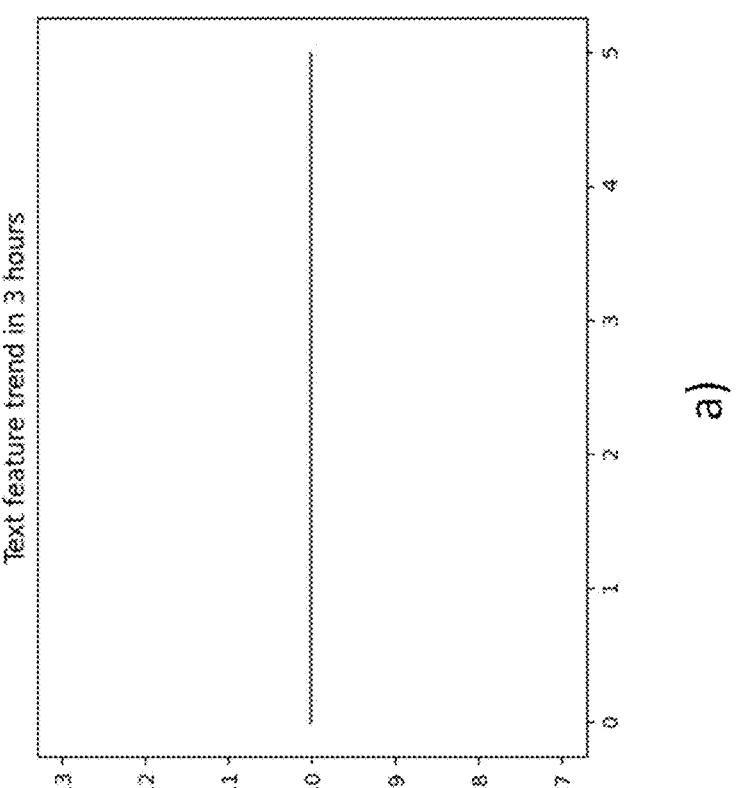
a)
FIG. 5

METHOD TO DETECTING INFINITE LOOPS IN REAL-TIME LOGS FROM A CONTINUOUS INTEGRATION ENVIRONMENT

FIELD

The field relates generally to real-time log collection, and more particularly to detecting infinite loops in real-time log collection in information processing systems.

BACKGROUND

Continuous Integration is a process within the development and release of software products that greatly improve efficiency. Continuous Integration supports the automated building and testing of applications.

SUMMARY

Illustrative embodiments provide techniques for implementing a log analysis system in a storage system. For example, illustrative embodiments monitor, by a log analysis system, execution of a continuous integration system on an information system. The log analysis system analyzes an output log of the continuous integration system to determine a trend associated with the execution of the continuous integration system, and identifies a job executing within the continuous integration system, that is executing in an infinite loop, based on the determined trend. Other types of processing devices can be used in other embodiments. These and other illustrative embodiments include, without limitation, apparatus, systems, methods and processor-readable storage media.

BRIEF DESCRIPTION OF THE DRAWINGS

FIG. 2 shows a flow diagram of a process for a log analysis system in an illustrative embodiment.

FIG. 5 illustrates extracted text features trends for an abnormal job, and for a normal job.

DETAILED DESCRIPTION

Figure 1:
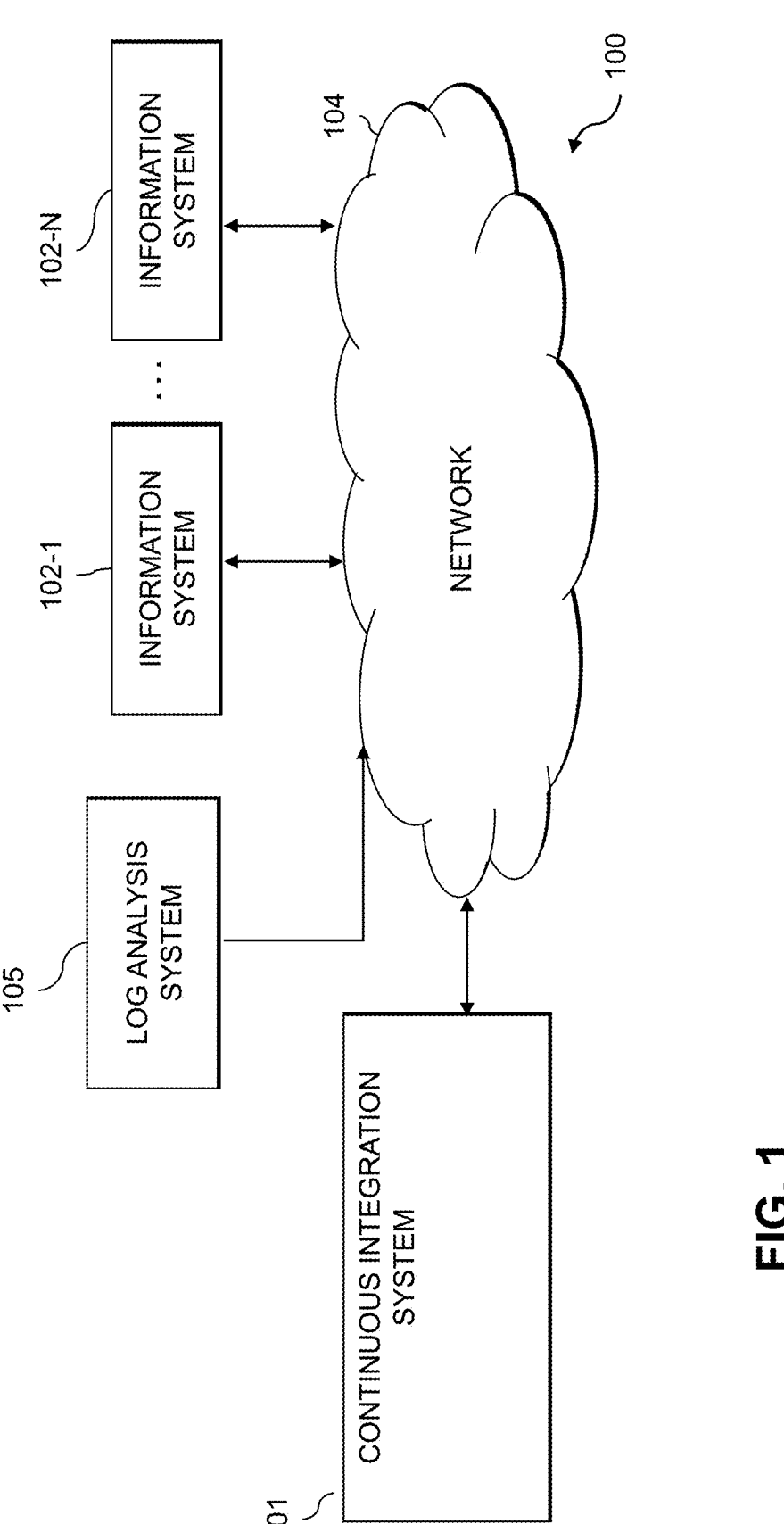
FIG. 1 shows an information processing system including a log analysis system in an illustrative embodiment.

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Described below is a technique for use in implementing a log analysis system, which technique may be used to provide, among other things detection of a job executing in an infinite loop by monitoring, by a log analysis system, execution of a continuous integration system on an information system. The log analysis system analyzes an output log of the continuous integration system to determine a trend associated with the execution of the continuous integration system, and identifies a job executing within the continuous integration system, that is executing in an infinite loop, based on the determined trend.

In research and development, there may be thousands of jobs running every day in a continuous integration system. Conventional technologies for monitoring jobs executing within a continuous integration system do not provide a mechanism for detecting when a job is executing in an infinite loop. Conventional technologies for continuous integration systems provide a job status indicating that the job is still running even when the job has essentially failed because it is executing within an infinite loop. A job executing in an infinite loop needlessly utilizes valuable time, development, and test resources. Conventional technologies for detecting job failures simply check for status updates (i.e., running or hung), but a job executing in an infinite loop will continue to provide status updates, and therefore the infinite loop will not be detected using conventional technologies. Conventional technologies that set a timeout limit for detecting infinite loops are inflexible in that they still may allow a job to execute in an infinite loop for far too long because the job is still executing and therefore is not a hung job.

By contrast, in at least some implementations in accordance with the current technique as described herein, an executing infinite loop is detected by monitoring, by a log analysis system, execution of a continuous integration system on an information system. The log analysis system analyzes an output log of the continuous integration system to determine a trend associated with the execution of the continuous integration system, and identifies a job executing within the continuous integration system, that is executing in an infinite loop, based on the determined trend.

Thus, a goal of the current technique is to provide a method and a system for a log analysis system that identifies a job that is executing in an infinite loop. Another goal is to save time and resources within a continuous integration system by detecting infinite loops soon after they occur. Another goal is to improve equipment utilization and save labor. Another goal is to provide a flexible system that detects infinite loops without relying on timeout setting or relying on checking for conventional status updates (i.e., a running or hung), both of which often fail to either detect infinite loops or detect infinite loops within a timely fashion. Yet another goal is to provide a system that can detect the difference between a hung job and a job executing within an infinite loop.

In at least some implementations in accordance with the current technique described herein, the use of a log analysis system can provide one or more of the following advantages: providing a log analysis system that identifies a job that is executing in an infinite loop, saving time and resources within a continuous integration system by detecting infinite loops soon after they occur, improving equipment utilization and saving on labor costs, providing a flexible system that detects infinite loops without relying on timeout setting or relying on checking for conventional status updates (i.e., running or hung), both of which often fail to either detect infinite loops or detect infinite loops within a timely fashion, and providing a system that can detect the difference between a hung job and a job executing within an infinite loop.

In contrast to conventional technologies, in at least some implementations in accordance with the current technique as described herein, an infinite loop is detected by monitoring, by a log analysis system, execution of a continuous integration system on an information system. The log analysis system analyzes an output log of the continuous integration system to determine a trend associated with the execution of the continuous integration system, and identifies a job executing within the continuous integration system, that is executing in an infinite loop, based on the determined trend.

In an example embodiment of the current technique, the log analysis system initiates a request for the output log of the continuous integration system. The log analysis system obtains a timestamp from the output log, where the timestamp is associated with a recent output log entry in the output log, and compares the timestamp with a current timestamp to determine if the output log has been updated within a given time period. The log analysis system initiates analysis of the output log upon determining that the output log has been updated within the given time period.

In an example embodiment of the current technique, the log analysis system determines an adaptive window length for the output log.

In an example embodiment of the current technique, the log analysis system increases the adaptive window length for the output log until a pattern in the output log is detected.

In an example embodiment of the current technique, the log analysis system increases the adaptive window length for the output log until the adaptive window length captures execution of the continuous integration system over a given time period.

In an example embodiment of the current technique, the log analysis system sections the output log according to the adaptive window length into a plurality of output log sections, and removes extraneous text from each of the plurality of output log sections.

In an example embodiment of the current technique, the log analysis system obtains a subset of the plurality of output log sections, where the subset comprises most recently generated entries of the output log.

In an example embodiment of the current technique, the log analysis system identifies patterns in a plurality of output log sections, and labels the patterns in the plurality of output log sections.

In an example embodiment of the current technique, the log analysis system identifies the trend associated with the execution of the continuous integration system based on the labelled patterns.

In an example embodiment of the current technique, the log analysis system predicts a subsequent labelled pattern based on the labelled patterns and the trend.

In an example embodiment of the current technique, the log analysis system identifies a last labelled pattern associated with a most recently generated entry in the plurality output log sections.

In an example embodiment of the current technique, the log analysis system predicts the subsequent labelled pattern using a linear regression model.

In an example embodiment of the current technique, the log analysis system extracts text features in the output log sections.

In an example embodiment of the current technique, the log analysis system obtains trigrams of text in the output log sections, sorts the trigrams by frequency, and converts the trigrams into a substring to obtain the extracted text features.

In an example embodiment of the current technique, the log analysis system sorts the trigrams by frequency for each of the output log sections individually.

In an example embodiment of the current technique, the log analysis system deduplicates the substrings, and joins the substrings into strings to identify the text features of the output log sections.

In an example embodiment of the current technique, the log analysis system compares a predicted subsequent labelled pattern with a last labelled pattern associated with the output log of the continuous integration system. The log analysis system determines that the last labelled pattern matches the predicted subsequent labelled pattern. The log analysis system determines that the job associated with the output log of the continuous integration system is executing in the infinite loop.

In an example embodiment of the current technique, the log analysis system determines, before the job is scheduled to finish, that the job associated with the output log of the continuous integration system is executing in the infinite loop.

FIG. 1 shows a computer network (also referred to herein as an information processing system) 100 configured in accordance with an illustrative embodiment. The computer network 100 comprises a continuous integration system 101, log analysis system 105, and information systems 102-N. The continuous integration system 101, log analysis system 105, and information systems 102-N are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is a log analysis system 105 that may reside on a storage system. Such storage systems can comprise any of a variety of different types of storage including network-attached storage (NAS), storage area networks (SANs), direct-attached storage (DAS) and distributed DAS, as well as combinations of these and other storage types, including software-defined storage.

Each of the information systems 102-N may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The information systems 102-N in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the log analysis system 105 are one or more input-output devices, which illustratively comprise keyboards, displays or other types of input-output devices in any combination. Such input-output devices can be used, for example, to support one or more user interfaces to the log analysis system 105, as well as to support communication between the log analysis system 105 and other related systems and devices not explicitly shown. For example, a dashboard may be provided for a user to view a progression of the execution of the log analysis system 105. One or more input-output devices may also be associated with any of the information systems 102-N.

Additionally, the log analysis system 105 in the FIG. 1 embodiment is assumed to be implemented using at least one processing device. Each such processing device generally comprises at least one processor and an associated memory, and implements one or more functional modules for controlling certain features of the log analysis system 105.

More particularly, the log analysis system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the log analysis system 105 to communicate over the network 104 with the continuous integration system 101, and information systems 102-N and illustratively comprises one or more conventional transceivers.

A log analysis system 105 may be implemented at least in part in the form of software that is stored in memory and executed by a processor, and may reside in any processing device. The log analysis system 105 may be a standalone plugin that may be included within a processing device.

It is to be understood that the particular set of elements shown in FIG. 1 for log analysis system 105 involving the continuous integration system 101, and information systems 102-N of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the log analysis system 105 can be on and/or part of the same processing platform.

An exemplary process of log analysis system 105 in computer network 100 will be described in more detail with reference to, for example, the flow diagram of FIG. 2.

FIG. 2 is a flow diagram of a process for execution of the log analysis system 105 in an illustrative embodiment. It is to be understood that this particular process is only an example, and additional or alternative processes can be carried out in other embodiments.

At 200, the log analysis system 105 monitors execution of a continuous integration system 101 on an information system. Examples of continuous integration system 101 may include, by are not limited to, Jenkins, CircleC, GitLab, etc.

At 202, the log analysis system 105 analyzes an output log of the continuous integration system to determine a trend associated with the execution of the continuous integration system. In an example embodiment, the log analysis system 105 initiates a request for the output log of the continuous integration system 101. For example, a job executing on the continuous integration system 101 may have been executing for n hours. The log analysis system 105 determines if the job has been updated in x hours where $1 \leq x \leq n$. In an example embodiment, the log analysis system 105 initiates a requires, for example, using the Python request module, to obtain the latest console text log. The log analysis system 105 then analyzes the console text log to determine the status of the job executing. In an example embodiment, the log analysis system 105 obtains a timestamp from the output log (i.e., the latest console text log), where the timestamp is associated with a recent output log entry in the output log. The log analysis system 105 then compares the timestamp with a current timestamp to determine if the output log has been updated within a given time period. In an example embodiment, the log analysis system 105 obtains the last timestamp from the console log and compares it to the current time. As noted above, if the job has been executing for n hours, the log analysis system 105 determines if the job has been updated in x hours. Thus, if the difference between the last timestamp of the console log and the current time is more than x hours, it means the console log has not been updated in more than x hours, and may have hung. However, if the job executing has updated within a given time period (i.e., less than x hours), then the job is not hung. In this example scenario, the log analysis system 105 initiates analysis of the output log upon determining that the output log has been updated within the given time period (where x hours is the given time period).

In an example embodiment, the log analysis system 105 determines an adaptive window length for the output log. For example, the adaptive window length may be y hours where $0 \leq y \leq x$. In an example embodiment, the log analysis system 105 increases the adaptive window length for the output log until a pattern in the output log is detected. In an example embodiment, the log analysis system 105 increases the adaptive window length for the output log until the adaptive window length captures execution of the continuous integration system over a given time period. In other words, the log analysis system 105 increases the adaptive window length until a duplicate pattern is found, or y=x.

In an example embodiment, the log analysis system 105 sections the output log according to the adaptive window length into a plurality of output log sections, and removes extraneous text from each of the plurality of output log sections. For example, the log analysis system 105 splits the output log into n windows, and cleans up the text of each window. For example, the timestamps in the output log are constantly changing over time, and can be filtered out, as can unnecessary punctuation. These need to be filtered out since they may affect the extraction of the text features that are needed to determine if the job is executing in an infinite loop.

In an example embodiment, the log analysis system 105 obtains a subset of the plurality of output log sections, where the subset comprises most recently generated entries of the output log. In other words, the log analysis system 105 identifies the latest m windows of the set of n windows so as to obtain the latest status of the executing job.

In an example embodiment, the log analysis system 105 identifies patterns in a plurality of output log sections, and labels the patterns in the plurality of output log sections. For example, the log analysis system 105 identifies patterns in the latest m windows of the set of n windows.

In an example embodiment, the log analysis system 105 identifies the patterns by extracting text features in the output log sections. In an example embodiment, the log analysis system 105 obtains trigrams of text in the output log sections. For example, the log analysis system 105 obtains the trigrams of each text line in each of the m windows using the n-gram algorithm. In an example embodiment, the log analysis system 105 sorts the trigrams by frequency. In another example embodiment, the log analysis system 105 sorts the trigrams by frequency for each of the output log sections (i.e., each m window) individually. In an example embodiment, the log analysis system 105 converts the trigrams into a substring to obtain the extracted text features. In an example embodiment, the log analysis system 105 deduplicates the substrings, and joins the substrings into strings to identify the text features of the output log sections.

In an example embodiment, the log analysis system 105 identifies the trend associated with the execution of the continuous integration system based on the labelled patterns. In an example embodiment, the log analysis system 105 identifies the trend for the identified text features. For example, the log analysis system 105 identifies the text features for each of the m windows. If the text features of the m windows are different from each other, the log analysis system 105 labels each of the m windows differently. If the text features of some or all of the m windows are the same, then the log analysis system 105 labels those windows (that have the same identified text features) with the same label.

In an example embodiment, the log analysis system 105 predicts a subsequent labelled pattern based on the labelled patterns and the trend. In other words, the log analysis system 105 predicts the label for the theoretical next window in the set of m windows. The log analysis system 105 does this by first identifying a last labelled pattern associated with the most recently generated entry in the plurality output log sections. In other words, the log analysis system 105 identifies the most recently generated m window and identifies the labelled pattern associated with that most recently generated m window. In an example embodiment, the log analysis system 105 predicts the labelled pattern for the theoretical next window in the set of m windows by predicting the subsequent labelled pattern using a linear regression model. In an example embodiment, the log analysis system 105 uses the identified trend to predict the label associated with the text features in the theoretical next window using linear regression.

Figure 3:
FIG. 3 illustrates the extracted text features and results of an abnormal job log in an illustrative embodiment.

At 204, identifying, by the log analysis system, a job executing within the continuous integration system, that is executing in an infinite loop, based on the determined trend. In an example embodiment, the job may have failed because of production issues, test script issues, test environment issue, network issues, etc., and may be executing in an infinite loop. In an example embodiment, the log analysis system 105 compares the predicted subsequent labelled pattern with a last labelled pattern associated with the output log of the continuous integration system. In other words, the log analysis system 105 compares the labelled pattern for the theoretical next window in the set of m windows, with the labelled pattern associated with the most recently generated m window. If the log analysis system 105 determines that the last labelled pattern matches the predicted subsequent labelled pattern, the log analysis system 105 determines that the job associated with the output log of the continuous integration system is executing in the infinite loop, as illustrated in FIG. 3. In an example embodiment, the log analysis system 105 determines, before the job is scheduled to finish, that the job associated with the output log of the continuous integration system is executing in the infinite loop.

Accordingly, the particular processing operations and other functionality described in conjunction with the flow diagram of FIG. 2 are presented by way of illustrative example only, and should not be construed as limiting the scope of the disclosure in any way. For example, the ordering of the process steps may be varied in other embodiments, or certain steps may be performed concurrently with one another rather than serially.

FIG. 3 illustrates the extracted text features and results of an abnormal job log in an illustrative embodiment. In this example embodiment, the extracted text features of each of the windows are the same, and therefore, the labelled patterns are the same. The predicted label of the next window, using linear regression, is also the same (in this example, the labelled pattern is "6"), and therefore, the job is executing in an infinite loop. FIG. 5a illustrates the extracted text feature trend over 3 hours for a job executing in an infinite loop.

Figure 4:
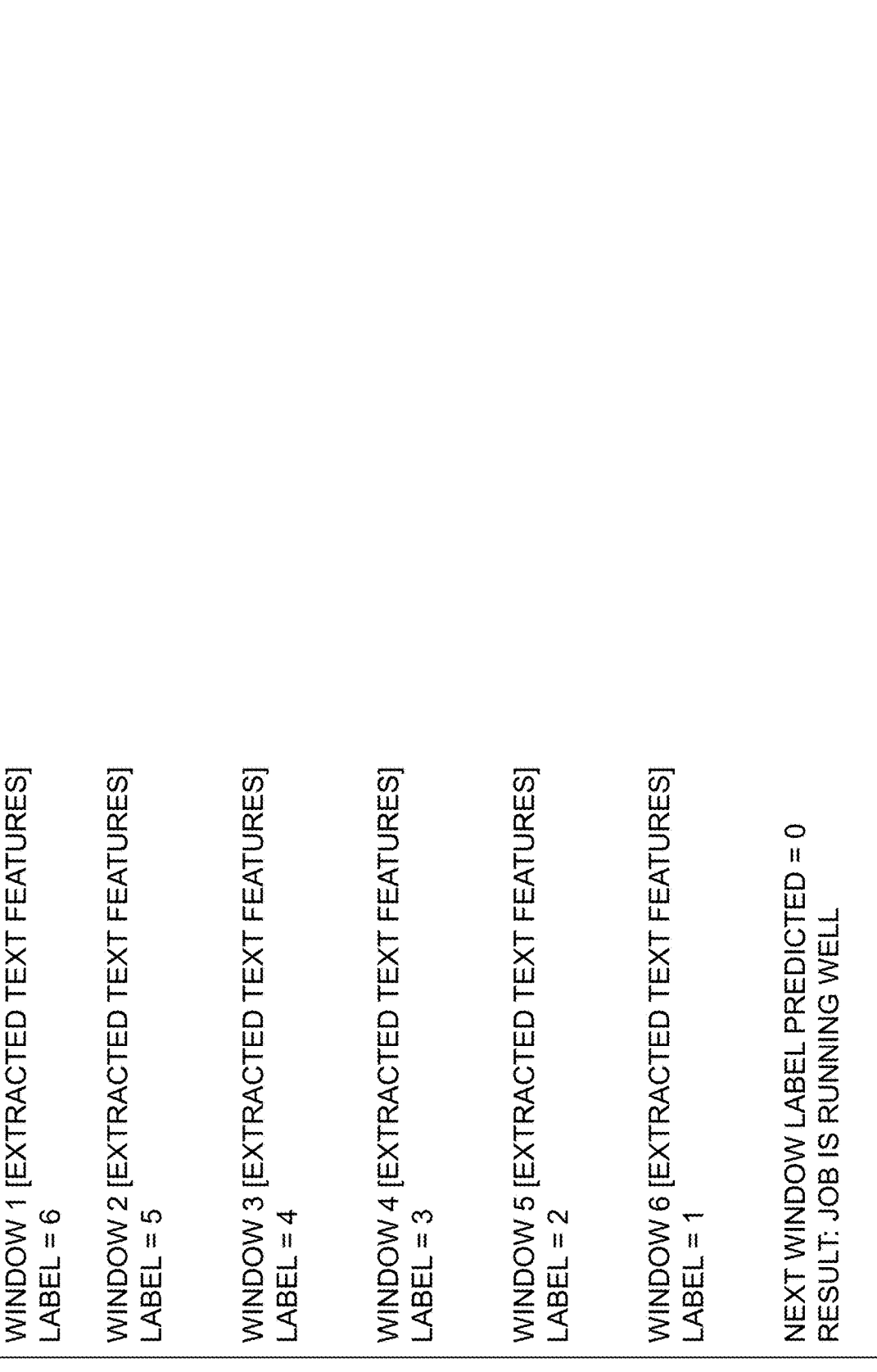
FIG. 4 illustrates the extracted text features and results of a normal job log in an illustrative embodiment.

FIG. 4 illustrates the extracted text features and results of a normal job log in an illustrative embodiment. In this example embodiment, the extracted text features of each of the windows are different from each other, and therefore, the labelled patterns are also different. The predicted label of the next window, using linear regression, is different from the most recent window (in this example, the predicted next labelled pattern is "0"), and therefore, the job is "updating" and therefore executing correctly. FIG. 5b illustrates the extracted text feature trend over 3 hours for a job that is executing normally.

The above-described illustrative embodiments provide significant advantages relative to conventional approaches. For example, some embodiments are configured to identify a job executing in an infinite loop within a continuous integration system. These and other embodiments can effectively improve detection of jobs executing in an infinite loops on information systems relative to conventional approaches. For example, embodiments disclosed herein provide a log analysis system that identifies a job that is executing in an infinite loop. Embodiments disclosed herein save time and resources within a continuous integration system by detecting infinite loops soon after they occur. Embodiments disclosed herein improve equipment utilization and save on labor costs. Embodiments disclosed herein provide a flexible system that detects infinite loops without relying on timeout setting or relying on checking for conventional status updates (i.e., running or hung), both of which often fail to either detect infinite loops or detect infinite loops within a timely fashion. Embodiments disclosed herein provide a system that can detect the difference between a hung job and a job executing within an infinite loop.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the information processing system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of the information processing system 100, these platforms may also be used to implement at least portions of other information processing systems in other embodiments.

Figure 6:
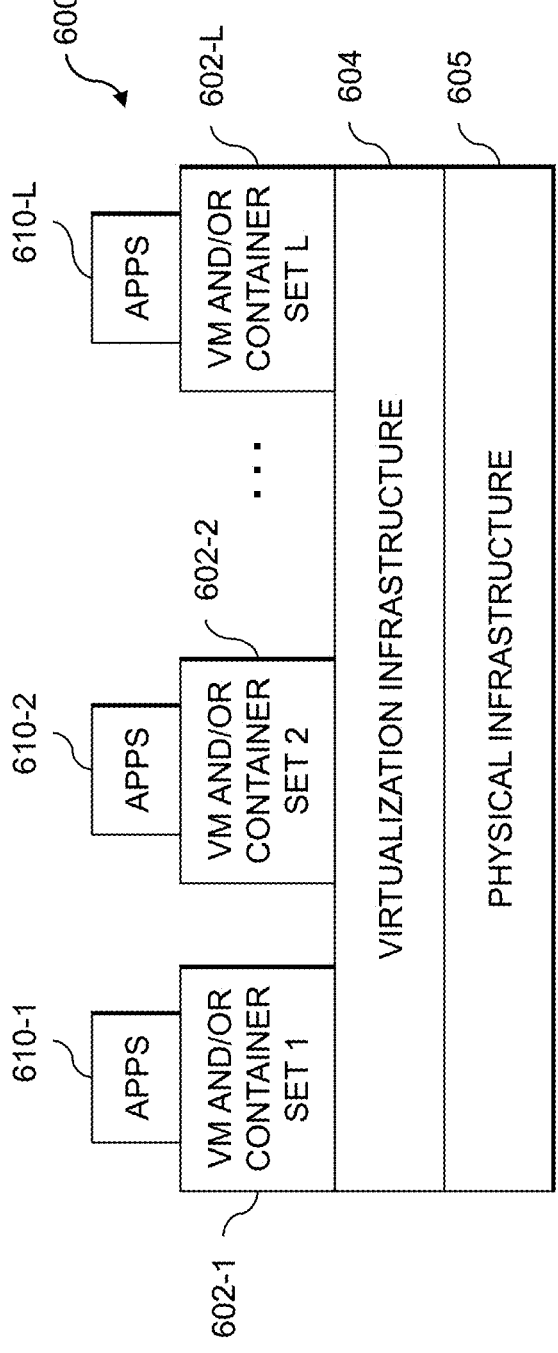
FIGS. 6 and 7 show examples of processing platforms that may be utilized to implement at least a portion of a log analysis system embodiments.
Figure 7:
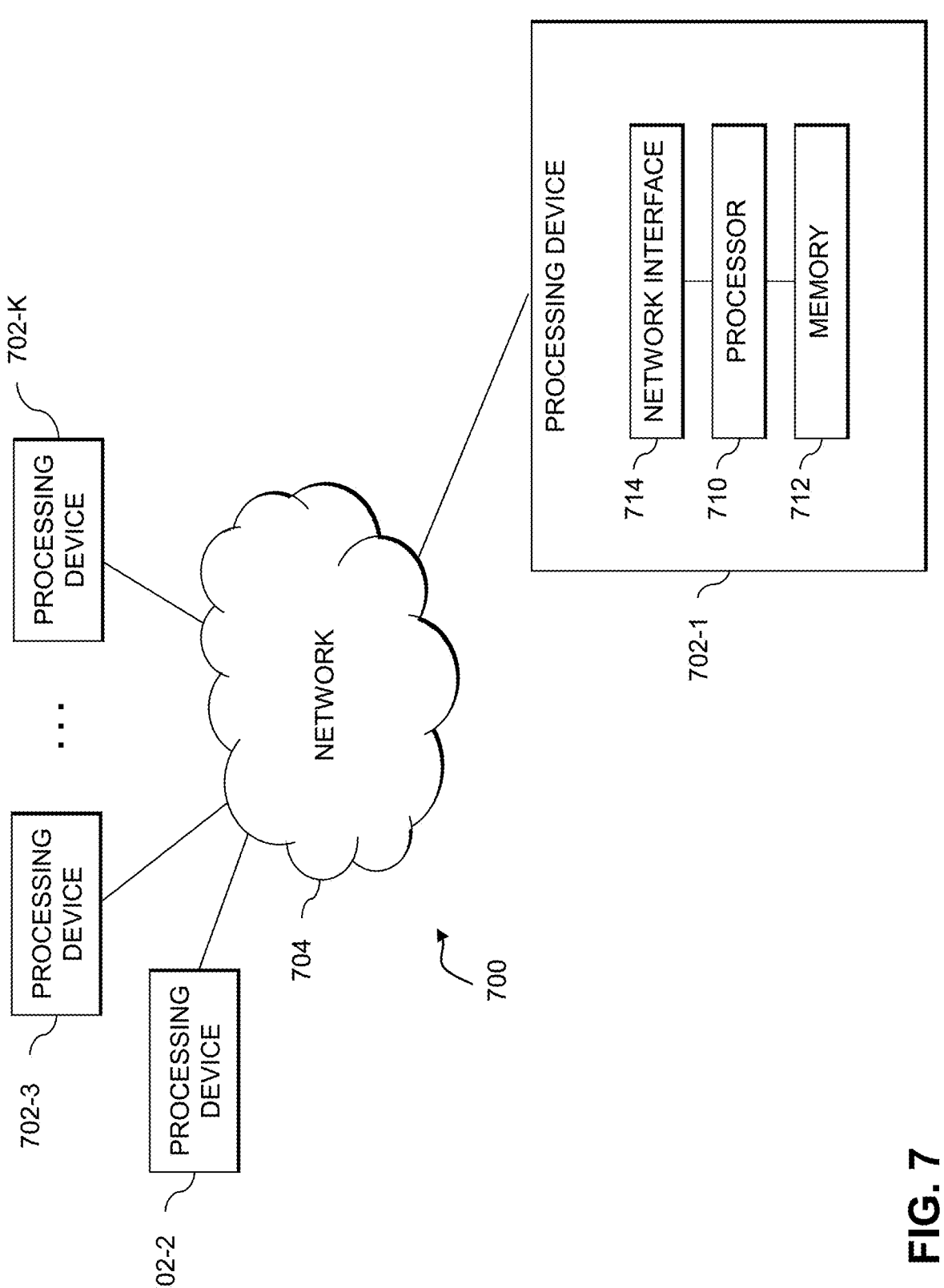

FIG. 6 shows an example processing platform comprising cloud infrastructure 600. The cloud infrastructure 600 comprises a combination of physical and virtual processing resources that are utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 comprise respective VMs, respective sets of one or more containers, or respective sets of one or more containers running in VMs. In some implementations of the FIG. 6 embodiment, the VMs/container sets 602 comprise respective VMs implemented using virtualization infrastructure 604 that comprises at least one hypervisor.

A hypervisor platform may be used to implement a hypervisor within the virtualization infrastructure 604, where the hypervisor platform has an associated virtual infrastructure management system. The underlying physical machines comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of the information processing system 100 may each run on a computer, server, storage device or other processing platform element. A given such element is viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of the information processing system 100 and includes a plurality of processing devices, denoted 702-1, 702-2, 702-3, . . . 702-K, which communicate with one another over a network 704.

The network 704 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 702-1 in the processing platform 700 comprises a processor 710 coupled to a memory 712.

The processor 710 comprises a microprocessor, a microcontroller, an application-specific integrated circuit (ASIC), a field-programmable gate array (FPGA) or other type of processing circuitry, as well as portions or combinations of such circuitry elements.

The memory 712 comprises random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and the information processing system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:

monitoring, by a log analysis system, execution of a continuous integration system on an information system in real-time;

analyzing, by the log analysis system, an output log of the continuous integration system to determine a trend associated with the execution of the continuous integration system, wherein the log analysis system splits the output log into a plurality of windows, wherein the analyzing uses trigram processing and n-gram algorithms to extract text features for pattern detection by using the n-gram algorithms to obtain trigrams of each text line in each window, wherein the analyzing comprises:

initiating a request for the output log of the continuous integration system;

obtaining a timestamp from the output log, wherein the timestamp is associated with a recent output log entry in the output log;

comparing the timestamp with a current timestamp to determine if the output log has been updated within a given time period; and initiating analysis of the output log upon determining that the output log has been updated within the given time period; and identifying, by the log analysis system, a job executing within the continuous integration system, that is executing in an infinite loop, based on the determined trend, to distinguish between a hung job and a job executing within an infinite loop and to save time and resources within the continuous integration system, and reporting out in a display that the job is executing in an infinite loop before the job is scheduled to finish, wherein the method is performed by at least one processing device comprising a processor coupled to a memory.

2. The method of claim 1 wherein analyzing, by the log analysis system, the output log of the continuous integration system comprises:

determining an adaptive window length for the output log.

3. The method of claim 2 further comprising:

increasing the adaptive window length for the output log until a pattern in the output log is detected.

4. The method of claim 2 further comprising:

increasing the adaptive window length for the output log until the adaptive window length captures execution of the continuous integration system over a given time period.

5. The method of claim 2 further comprising:

sectioning the output log according to the adaptive window length into a plurality of output log sections; and removing extraneous text from each of the plurality of output log sections.

6. The method of claim 5 wherein sectioning the output log according to the adaptive window length into the plurality of output log sections comprises:

obtaining a subset of the plurality of output log sections, wherein the subset comprises most recently generated entries of the output log.

7. The method of claim 1 wherein determining the trend associated with the execution of the continuous integration system comprises:

identifying patterns in a plurality of output log sections; and labeling the patterns in the plurality of output log sections.

8. The method of claim 7 further comprising:

identifying the trend associated with the execution of the continuous integration system based on the labelled patterns.

9. The method of claim 8 further comprising:

predicting a subsequent labelled pattern based on the labelled patterns and the trend.

10. The method of claim 9 wherein predicting the subsequent labelled pattern comprises:

identifying a last labelled pattern associated with a most recently generated entry in the plurality output log sections.

11. The method of claim 9 wherein predicting the subsequent labelled pattern comprises:

predicting the subsequent labelled pattern using a linear regression model.

12. The method of claim 7 wherein identifying patterns in the plurality of output log sections comprises:

extracting text features in the output log sections.

13. The method of claim 12 wherein extracting the text features in the output log sections comprises:

obtaining trigrams of text in the output log sections;

sorting the trigrams by frequency; and converting the trigrams into a substring to obtain the extracted text features.

14. The method of claim 13 wherein sorting the trigrams by frequency comprises:

sorting the trigrams by frequency for each of the output log sections individually.

15. The method of claim 13 wherein converting the trigrams into the substring to obtain the extracted text features comprises:

deduplicating the substrings; and joining the substrings into strings to identify the text features of the output log sections.

16. The method of claim 1 wherein identifying, by the log analysis system, the job executing within the continuous integration system, that is executing in the infinite loop comprises:

comparing a predicted subsequent labelled pattern with a last labelled pattern associated with the output log of the continuous integration system;

determining that the last labelled pattern matches the predicted subsequent labelled pattern; and determining that the job associated with the output log of the continuous integration system is executing in the infinite loop.

17. The method of claim 16 wherein determining that the job associated with the output log of the continuous integration system is executing in the infinite loop comprises:

determining, before the job is scheduled to finish, that the job associated with the output log of the continuous integration system is executing in the infinite loop.

18. A system comprising:

at least one processing device comprising a processor coupled to a memory;

the at least one processing device being configured:

to monitor, by a log analysis system, execution of a continuous integration system on an information system;

to analyze, by the log analysis system, an output log of the continuous integration system to determine a trend associated with the execution of the continuous integration system, wherein the log analysis system splits the output log into a plurality of windows, wherein the analyzing uses trigram processing and n-gram algorithms to extract text features for pattern detection by using the n-gram algorithms to obtain trigrams of each text line in each window, wherein the analyzing comprises:

initiating a request for the output log of the continuous integration system;

obtaining a timestamp from the output log, wherein the timestamp is associated with a recent output log entry in the output log;

comparing the timestamp with a current timestamp to determine if the output log has been updated within a given time period; and initiating analysis of the output log upon determining that the output log has been updated within the given time period; and to identify, by the log analysis system, a job executing within the continuous integration system, that is executing in an infinite loop, based on the determined trend, to distinguish between a hung job and a job executing within an infinite loop and to save time and resources within the continuous integration system, and reporting out in a display that the job is executing in an infinite loop before the job is scheduled to finish.

19. A non-transitory processor-readable storage medium having stored therein program code of one or more software programs, wherein the program code when executed by at least one processing device causes said at least one processing device:

to monitor, by a log analysis system, execution of a continuous integration system on an information system;

to analyze, by the log analysis system, an output log of the continuous integration system to determine a trend associated with the execution of the continuous integration system, wherein the log analysis system splits the output log into a plurality of windows, wherein the analyzing uses trigram processing and n-gram algorithms to extract text features for pattern detection by using the n-gram algorithms to obtain trigrams of each text line in each window, wherein the analyzing comprises:

initiating a request for the output log of the continuous integration system;

obtaining a timestamp from the output log, wherein the timestamp is associated with a recent output log entry in the output log;

comparing the timestamp with a current timestamp to determine if the output log has been updated within a given time period; and to identify, by the log analysis system, a job executing within the continuous integration system, that is executing in an infinite loop, based on the determined trend, to distinguish between a hung job and a job executing within an infinite loop and to save time and resources within the continuous integration system, and reporting out in a display that the job is executing in an infinite loop before the job is scheduled to finish.

\* \* \* \* \*